April 1, 1924.  
O. A. FREEZE  
1,489,201  
COMBINATION PIPE FITTING AND TRAP  
Filed June 29, 1923   2 Sheets-Sheet 1

Inventor:  
OTIS A. FREEZE,  
By W. J. FitzGerald & Co.  
Attorney.

April 1, 1924.

O. A. FREEZE

COMBINATION PIPE FITTING AND TRAP

Filed June 29, 1923  2 Sheets-Sheet 2

1,489,201

Inventor:
OTIS A. FREEZE,
By W. J. FitzGerald
Attorney.

Patented Apr. 1, 1924.

1,489,201

UNITED STATES PATENT OFFICE.

OTIS A. FREEZE, OF JOLIET, ILLINOIS.

COMBINATION PIPE FITTING AND TRAP.

Application filed June 29, 1923. Serial No. 648,486.

*To all whom it may concern:*

Be it known that I, OTIS A. FREEZE, a citizen of the United States, residing at Joliet, in the county of Will and State of Illinois, have invented certain new and useful Improvements in Combination Pipe Fittings and Traps; and I do hereby declare the following to be a full, clear, and exact description of the invention, such as will enable others skilled in the art to which it appertains to make and use the same.

The present invention relates to pipe fittings, and aims to provide a novel pipe fitting for the drain pipe of a dwelling or other building, having combined therewith as an integral unit, a trap provided with one or more inlet portions for the connection of branch pipes, and preventing the escape of gases from the drain pipe back through the branch pipes.

The invention resides in the novel combination of a pipe section and trap comprising an integral unit and providing for several advantages as hereinafter set forth.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
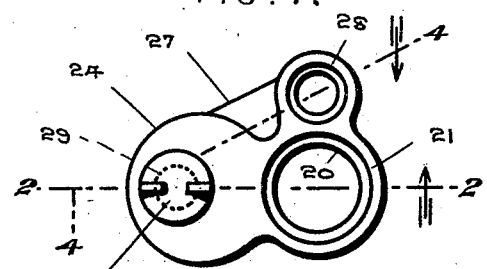
Figure 1 is a plan view of one form of combination pipe fitting and trap embodying the improvements.
Figure 3:
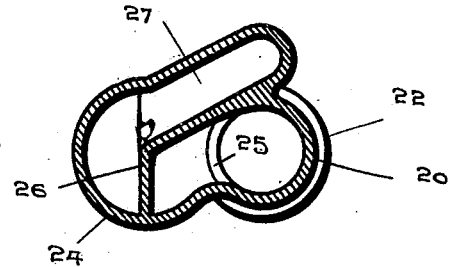
Fig. 3 is a section on the line 3—3 of Fig. 2.
Figure 2:
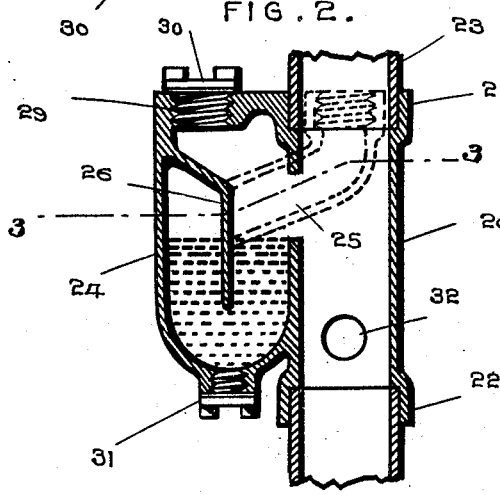
Fig. 2 is a vertical section on the line 2—2 of Fig. 1.
Figure 4:
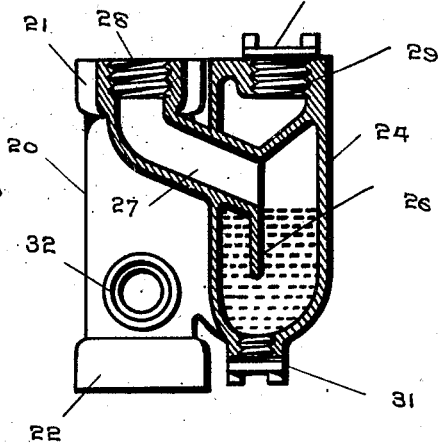
Fig. 4 is a vertical section on the line 4—4 of Fig. 1.

Referring to Figs. 1, 2, 3 and 4, the pipe fitting comprises the pipe section or tubular body 20 having the faucet or bell ends 21 and 22 to receive the spigot ends of the pipe sections 23 of the drain pipe of a building, which usually extends within or adjacent to one of the walls of the building to receive the drainage from the several floors of the building. The ends of the pipe section or body 20 may have screw-thread or other means of connection instead of the faucet and spigot connections shown. The body or pipe section 20 has cast as an integral unit therewith a trap chamber 24 located at one side of the body or pipe section 20, the wall of the pipe section 20 at said side forming a partition between the passage of the pipe section and the interior of the trap chamber. This wall or partition has an opening 25 establishing communication between the pipe section and chamber, and said chamber will hold water in the lower portion thereof up to the level of the lower edge of the opening 25. The chamber 24 is provided therein with a partition 26 integral with opposite side walls of the chamber, with its lower end extending downwardly past the horizontal plane or level of the lower edge of the opening 25, while the upper end portion of the partition extends at an angle away from the opening 25 and merges into the wall of the chamber opposite to said opening, as clearly seen in Fig. 2.

The casting is formed with an inclined passage 27 extending through the wall of the chamber 24 at one side, and the lower end portion of the wall of said passage is united with the partition 26, whereby the passage 27 opens into the chamber at that side of the partition 26 opposite to the opening 25. The passage 27 is located at one side of the pipe section 20 and its upper end extends upwardly and terminates flush with the upper end of the pipe section 20. The upper end portion of the passage 27 may be screw threaded, as at 28, or formed with a faucet or other portion for the connection of the branch pipe leading from the fixtures. By having the passage 27 terminating substantially flush with the upper end of the pipe section 20, this provides for the convenient connection of the branch pipe with the trap. The upper end of the chamber 24 is also preferably flush with the upper end of the pipe section, whereby the casting can be substantially flush with the floor if desired, with the top of the chamber 24 and upper end portion of the passage 27 exposed or readily accessible.

The water which drains down through the passage 27 must pass under the partition 26 to flow through the opening 25 into the drain pipe, so that the water in the lower portion of the trap chamber provides a water seal to prevent the gases from passing reversely from the drain pipe through the trap into the passage 27.

The top of the trap chamber has an opening 29 above the partition 26, normally closed by the screw plug 30, whereby access can be had into the trap when the plug is removed, or the plug can be removed and the opening 29 used for the connection of another branch pipe to discharge into the trap chamber between the partition 26 and opening 25 without the water having to pass under the partition. The opening 29 and plug 30 being located at the top of the trap are readily accessible.

The trap chamber 24 has at its bottom a drain plug 31 which can be removed for draining or cleaning out the trap.

The pipe section 20 may have means for the connection of one or more other branch pipes, and, as shown, the pipe section 20 has a branch 32 for the connection of a branch pipe. This branch, or several of them, can be of different formations, to provide Y-connections, elbow connections, T-connections, and the like.

Figure 5:
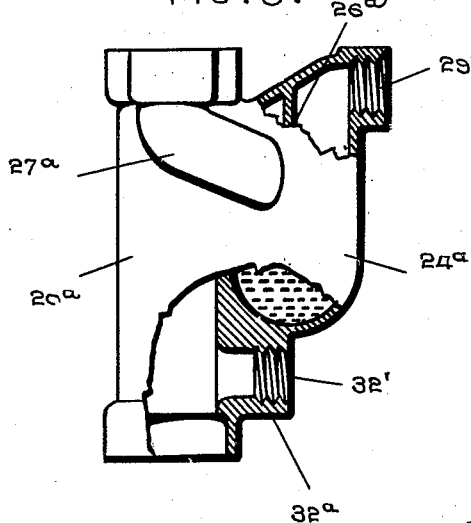
Fig. 5 is a view, partly in elevation and partly in section, of a modified form.

Fig. 5 shows the partition $26^a$ extending upwardly and united with the top of the trap chamber $24^a$, said chamber having an opening $29^a$ at that side of the partition opposite to the pipe section $20^a$, with the top of the trap chamber extending on an incline to the upper portion of the opening $29^a$. The passage $27^a$ is shown at the near side of the pipe section and trap chamber, and there is illustrated a further modification by the provision of a boss $32^a$ integral with the lower end or bottom of the chamber $24^a$ and corresponding side of the pipe section $20^a$ and having an opening $32'$ for the connection of a branch pipe to discharge directly into the drain pipe under the trap. Wherever screw threaded connections are shown, it will be understood that slip, faucet, and spigot, and other connections can be used, and vice versa.

Figure 6:
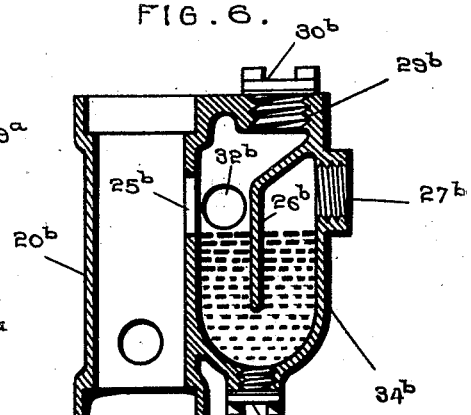
Fig. 6 is a vertical section of a third form.

Fig. 6 shows the pipe section $20^b$, trap chamber $24^b$, opening $25^b$, partition $26^b$, opening $29^b$ and plugs $30^b$ and $31^b$ substantially the same as in Figs. 1–4. There is also shown an opening $27^b$ in the wall of the trap chamber at that side of the partition $26^b$ opposite to the opening $25^b$, for the connection of a branch pipe, and the wall of the trap chamber also has an opening $32^b$ for the connection of a branch pipe between the partition $26^b$ and opening $25^b$.

Figure 7:
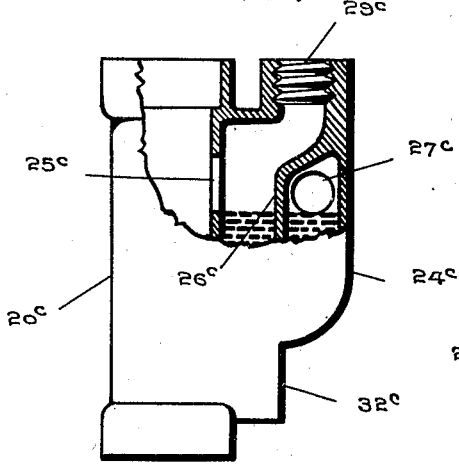
Figs. 7 and 8 are views, partly in elevation and partly in section, showing other forms including certain variations.

Fig. 7 shows the boss $32^c$ between the lower end of the trap chamber $24^c$ and the pipe section $20^c$, with the top or upper end of the trap chamber having an upstanding boss provided with the opening $29^c$. The wall of the trap chamber has an inlet opening $27^b$ for the connection of a branch pipe at that side of the partition $26^c$ opposite to the opening $25^c$ between the trap chamber and pipe section.

Figure 8:
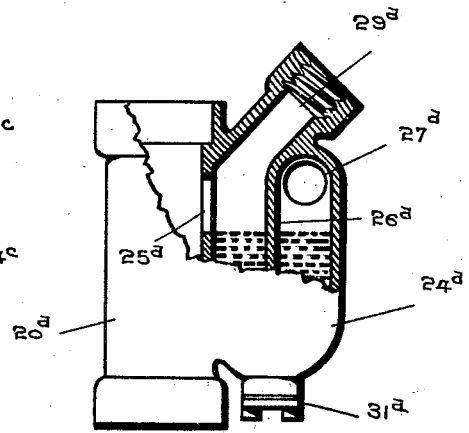

Fig. 8 illustrates a further variation, the opening $29^d$ being inclined to extend upwardly at an angle from the opening $25^d$ above the partition $26^b$, and the trap chamber $24^d$ has an opening $27^d$ for the connection of a branch pipe below the opening $29^d$ and at that side of the partition opposite to the opening $25^d$ between the trap chamber and pipe section $20^d$. The trap chamber is shown as having the drain plug $31^d$ at the bottom.

Figure 9:
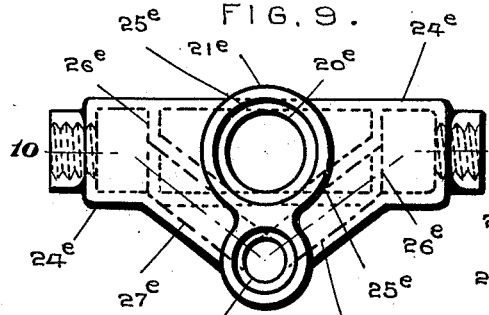
Fig. 9 is a plan view of a device embodying a double trap.
Figure 10:
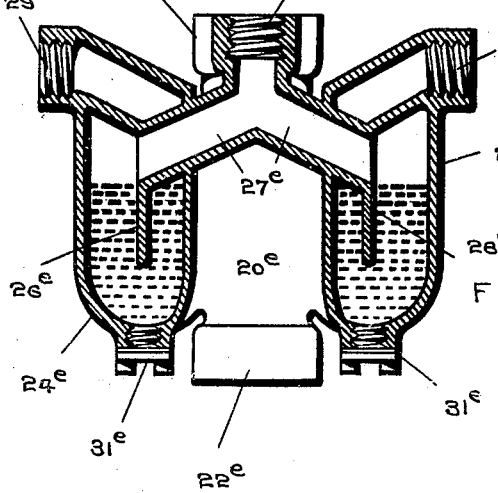
Fig. 10 is a section on the line 10—10 of Fig. 9.

Figs. 9 and 10 show a fixture having two traps. Thus, the trap chambers $24^e$ are cast integral with the pipe section $20^e$ at the opposite sides thereof, and said pipe section has faucets $21^e$ and $22^e$ at the upper and lower ends thereof, or other means for the connection of the companion pipe sections. There is an opening $25^e$ between each trap chamber and the passage of the pipe section $20^e$, the same as in the other constructions, and each trap chamber has a partition $26^e$ therein.

The passages $27^e$ which open through the partitions $26^e$, diverge downwardly at one side of the pipe section $20^e$ from a common opening or terminal portion $28^e$ to which a branch pipe or pipes can be connected, said portion $28^e$ being substantially flush with the upper end of the pipe section $20^e$. The upper ends of the trap chambers have the openings $29^e$ opening above the partitions in the direction away from the pipe section $20^e$ for the connection of other branch pipes, or said openings can be plugged closed. Each trap chamber has a drain plug $31^e$.

Figure 11:
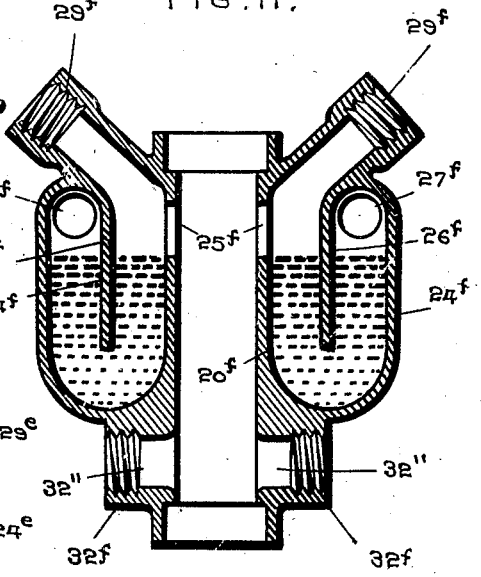
Fig. 11 is a vertical section of still another double trap device.

Fig. 11 shows another type of double trap fixture, the trap chambers $24^f$ being cast integral with the opposite sides of the pipe section $20^f$, and the traps are of the kind shown in Fig. 8, excepting that the bosses $32^e$ are provided between the lower ends of the trap chambers and pipe section $20^f$, having the openings $32''$ for the connection of branch pipes to discharge directly into the pipe section. The openings $29^f$ extend upwardly at an angle from the openings $25^f$, and the trap chambers have inlet openings $27^f$ for the connection of branch pipes at those sides of the partitions 26' opposite to the openings 25'.

Having thus described the invention, what is claimed as new is:—

1. A combination pipe fitting and trap comprising a vertical pipe section, a trap chamber at one side thereof and integral therewith, said pipe section and chamber having a partition between them provided with an opening, said chamber having a partition therein extending downwardly below the horizontal plane of the lower edge of said opening, and a passage opening through said partition into said chamber at that side of the partition opposite to said opening, said passage extending upwardly at one side of said pipe section.

2. A combination pipe fitting and trap comprising a vertical pipe section, a trap chamber at one side thereof and integral therewith, said pipe section and chamber having a partition between them provided with an opening, the chamber having a partition therein extending downwardly below the horizontal plane of the lower edge of said opening, and a passage leading through the wall of said chamber and opening through said partition to communicate with said chamber at that side of the partition opposite to said opening, said passage extending upwardly at one side of said pipe section for the connection of a branch pipe, with the upper ends of said passage and pipe section substantially flush.

In testimony whereof I have signed my name to this specification in the presence of two subscribing witnesses.

OTIS A. FREEZE.

Witnesses:
PEARL M. FREEZE,
LUCIUS WITHERS.